(12) United States Patent
Braun et al.

(10) Patent No.: US 7,256,514 B2
(45) Date of Patent: Aug. 14, 2007

(54) DEVICE AND METHOD FOR OPERATING AN ELECTRICAL MACHINE FOR A MOTOR VEHICLE

(75) Inventors: Harald Braun, Esslingen (DE); Norbert Ebner, Ludwigsburg (DE); Franz Nietfeld, Esslingen (DE); Fritz Schmidt, Waiblingen (DE)

(73) Assignee: DaimlerChrysler AG, Stuttgart (DE)

( * ) Notice: Subject to any disclaimer, the term of this patent is extended or adjusted under 35 U.S.C. 154(b) by 511 days.

(21) Appl. No.: 10/759,535

(22) Filed: Jan. 20, 2004

(65) Prior Publication Data

US 2004/0195017 A1 Oct. 7, 2004

(30) Foreign Application Priority Data

Jan. 17, 2003 (DE) ................ 103 01 531

(51) Int. Cl.
*H02H 7/18* (2006.01)
(52) U.S. Cl. ............... 307/10.7; 307/153; 318/434; 903/930
(58) Field of Classification Search ............ 307/152, 307/153, 10.7; 318/743; 701/84
See application file for complete search history.

(56) References Cited

U.S. PATENT DOCUMENTS 3,899,725 A * 8/1975 Plunkett ............... 318/802
6,324,460 B1 * 11/2001 Lehmer et al. ............... 701/83
6,343,252 B1 * 1/2002 Asami et al. ............... 701/113
6,504,327 B2 * 1/2003 Omata et al. ............... 903/942
6,757,598 B2 * 6/2004 Okoshi ............... 903/942
6,953,100 B2 * 10/2005 Aberle et al. ............... 180/65.3

FOREIGN PATENT DOCUMENTS

| DE | 197 09 135 C1 | 11/1998 |
|----|---------------|---------|
| DE | 199 47 922 A1 | 4/2001 |
| DE | 100 25 037 A1 | 11/2001 |
| DE | 100 46 631 A1 | 3/2002 |

OTHER PUBLICATIONS

German Search Report dated Mar. 21, 2006 (Five (5) Pages).

* cited by examiner

*Primary Examiner*—Michael Sherry
*Assistant Examiner*—Andrew Deschere
(74) *Attorney, Agent, or Firm*—Crowell & Moring LLP

(57) ABSTRACT

Device and method for operation of at least one electrical machine for a motor vehicle. In order to coordinate torque requirements for the propulsion system and voltage requirements for the vehicle power supply system and at least one battery for the vehicle power supply system, a voltage reference variable is formed for the voltage requirements for the vehicle power supply system, and a torque reference variable is formed for the torque requirements of the propulsion system. The voltage reference variable is limited by upper and lower torque limit values which must not be overshot or undershot in the event of changes to the voltage reference variable. The torque reference variable is limited by voltage limit values which must not be overshot or undershot in the event of torque changes.

14 Claims, 2 Drawing Sheets

DEVICE AND METHOD FOR OPERATING AN ELECTRICAL MACHINE FOR A MOTOR VEHICLE

BACKGROUND AND SUMMARY OF THE INVENTION

This application claims the priority of German Application No. 103 01 531.0, filed Jan. 17, 2003, the disclosure of which is expressly incorporated by reference herein.

The invention relates to a device and a method for operating an electrical machine for a motor vehicle.

In motor vehicles, electrical machines are used as a generator for charging one or more vehicle power supply system batteries. The battery provides the electrical power which is required for starting the internal combustion engine for the propulsion system, for the vehicle external lighting, for the vehicle internal lighting and for other auxiliary units such as the air conditioning, seat heating, refrigerator or freezer compartment, windscreen wipers and similar electrical appliances. During normal charging operation, when the electrical machine is operated as a generator, it in each case produces the current which is drawn by the electrical loads from the battery. The electrical machine is driven by a control device, which is preferably formed by power electronics. The electrical machine is driven by preset voltages, voltage ramps and current limits. If the drive for the electrical machine is controlled such that the torque requirements for the propulsion system have priority, then there is a risk that the supply to the vehicle power supply system and the battery will be insufficient. If, on the other hand, the drive for the electrical machine is controlled by the vehicle power supply system management to have priority, taking account of the current demand of the vehicle power supply system and the respective state of charge of the battery at that time, then the advantages of the electrical machine for the propulsion system are utilized only inadequately.

The invention is intended to achieve the object of avoiding the drive for the electrical machine having disadvantageous influences on the propulsion system, in particular in the form of sudden torque changes, or on the vehicle power supply system and the vehicle battery, without this resulting in any restriction to the functionality of the propulsion system, or to the vehicle power supply system or the vehicle power supply system battery.

According to the invention, the solution comprises a device and a method for open-loop or closed-loop control of the electrical system and the propulsion system of a motor vehicle. The propulsion system has an internal combustion engine and a transmission with a variable step-up and/or step-down ratio. The electrical system has a vehicle power supply system and at least one battery connected to it. At least one electrical machine is provided which can be driven during normal charging operation as a generator for supplying current to the battery and to the vehicle power supply system from the propulsion system, in which case the electrical machine can also be driven by the propulsion system as a generator in a recuperation mode in order to produce a braking torque, and can likewise supply the battery and the vehicle power supply system with current in this case. The electrical machine can preferably also be operated as an electric motor in order to emit torque to the propulsion system. The device is designed to control the at least one electrical machine in different operating states by different signals, in which case a charging voltage for the normal charging mode is produced automatically as a voltage reference variable for controlling the electrical machine from signals from vehicle management as a function of the respective requirements for electrical power from the vehicle power supply system and from the battery at any given time. The device is furthermore designed to automatically provide the respective torque demand at any given time as a torque reference variable for controlling the electrical machine as a function of the respective requirements, at that time, for a positive or negative torque for the propulsion system, in which case changes in the voltage reference variable (U-LADE) downwards and upwards are limited by predetermined torque limit values for the electrical machine which define a torque tolerance band. Furthermore, changes in the torque reference variable upwards and downwards are limited by predetermined voltage limit values for the electrical machine, which form a voltage tolerance band. Means are provided for automatic cyclic checking of the reference variables. The electrical machine is controlled automatically by the voltage reference variable, but a change takes place to the torque reference variable for controlling the electrical machine, provided that the tolerance bands are complied with, when and for as long as the torque reference variable demanded from the electrical machine is a positive or negative torque, which is not the same as the predetermined torque on the electrical machine, in order to produce the charging voltage.

Accordingly, the stated object is achieved by a device and a method for operation of an electrical machine for a motor vehicle in accordance with the claims.

Advantages of the Invention

Both a boost function as well as a battery charging function and recuperation as well can always achieve their full effect in any vehicle situation and satisfy all the requirements of the "vehicle propulsion, battery and vehicle power supply" systems, provided that this is physically possible.

This avoids the time-consuming application (adaptation control device), which is susceptible to faults, of vehicle power supply system requirements and battery requirements for the propulsion system control, in particular for the internal combustion engine control device. The expression "recuperation" in this case means braking of the motor vehicle by means of the electrical machine by operating it in a predetermined manner as a generator.

Coordination of the braking torques and propulsion torques is possible only by taking into account "available torques" according to the invention. In addition to other advantages, this also makes it possible to compensate for recuperation torques by using a braking controller which can control the vehicle wheel axles individually.

The initial calculation of torques will be described in the following text, A function is provided by which missing input signals can be calculated in advance from output signals from the electrical machine, for example a generator. Among other variables, torque variables, for example, are calculated in advance for the unit coordinator (initial torque calculation). The function cycle time may, for example, be 50 ms or some other variable. Provision is preferably made for the instantaneous value of the generator current of the electrical machine to be determined from a family of characteristics via the rotation speed and the field current of the generator. A stored generator identification can be used to identify which generator is being used and which generator family of characteristics should be used. If the instantaneous voltage is not the same as the voltage in the family of characteristics, the generator current is corrected accordingly. If the electrical machine is in the full excitation range, then a correction current is determined from a family of characteristics via the rotation speed and the voltage, and is calculated using the generator current. Furthermore, the instantaneous value of the generator efficiency can be determined from a family of characteristics via the rotation speed and the power of the generator. The generator identification data is used to identify what generator is fitted in the motor vehicle and which family of characteristics should be used. The instantaneous value of the generator torque is calculated from the instantaneous values of the current, voltage, efficiency and rotation speed.

Generator charging torque (the torque which the electrical machine requires to charge the battery in the generator mode): the instantaneous value of the generator charging torque is calculated from the following vehicle power supply system variables: charging voltage, charging current, generator efficiency and generator rotation speed. If the device is in the charging mode, the process switches to the instantaneous value of the generator torque.

Minimum statistically possible generator charging torque (maximum statistically possible negative torque on the electrical machine in the generator mode): the maximum amount of power which can be drawn from the vehicle power supply system including its battery can be calculated from the following vehicle power supply system variables: recuperation voltage and recuperation current. The maximum power of the generator can be determined from a characteristic via the rotation speed of the electrical machine. The generator identification data can be used to identify what generator is installed in the motor vehicle, and which characteristic should be used. The lesser of these two variables is used, and this represents the narrower limit for the system. The maximum possible torque from this electrical machine at any given time when being operated as a generator can be calculated from this variable with the aid of the instantaneous efficiency and the rotation speed of this electrical machine.

Maximum statistically possible generator charging torque (the minimum statistically possible torque of the electrical machine as a generator and the maximum motor torque as a motor): the maximum power emitted from the vehicle power supply system including its battery can be calculated from the following vehicle power supply system variables: minimum voltage and maximum current. The minimum motoring power of the electrical machine when operating as a generator can be determined from an applicable fixed value using the generator rotation speed. For this purpose, it is possible to identify from the generator identification what electrical machine is installed as a generator, and which fixed value should be used. The larger of these two variables is used, and this represents the narrower limit for the system. The minimum possible torque for the electrical machine at any given time when being operated as a generator and the maximum possible torque for the electrical machine when being operated as a motor can be calculated from this variable with the aid of the instantaneous efficiency and the rotation speed of the electrical machine.

The minimum dynamically possible generator charging torque for the electrical machine is equal to the minimum static generator charging torque when the battery is empty and the recuperation voltage U-Rekup is equal to the maximum voltage U-Grenz.

The stated determination processes and calculations can each be carried out automatically by control devices.

Other objects, advantages and novel features of the present invention will become apparent from the following detailed description of the invention when considered in conjunction with the accompanying drawings.

DETAILED DESCRIPTION OF THE DRAWINGS

The invention relates to a motor vehicle and, in particular, to a device for coordination of the propulsion system and of the vehicle power supply system for a motor vehicle.

Figure 1:
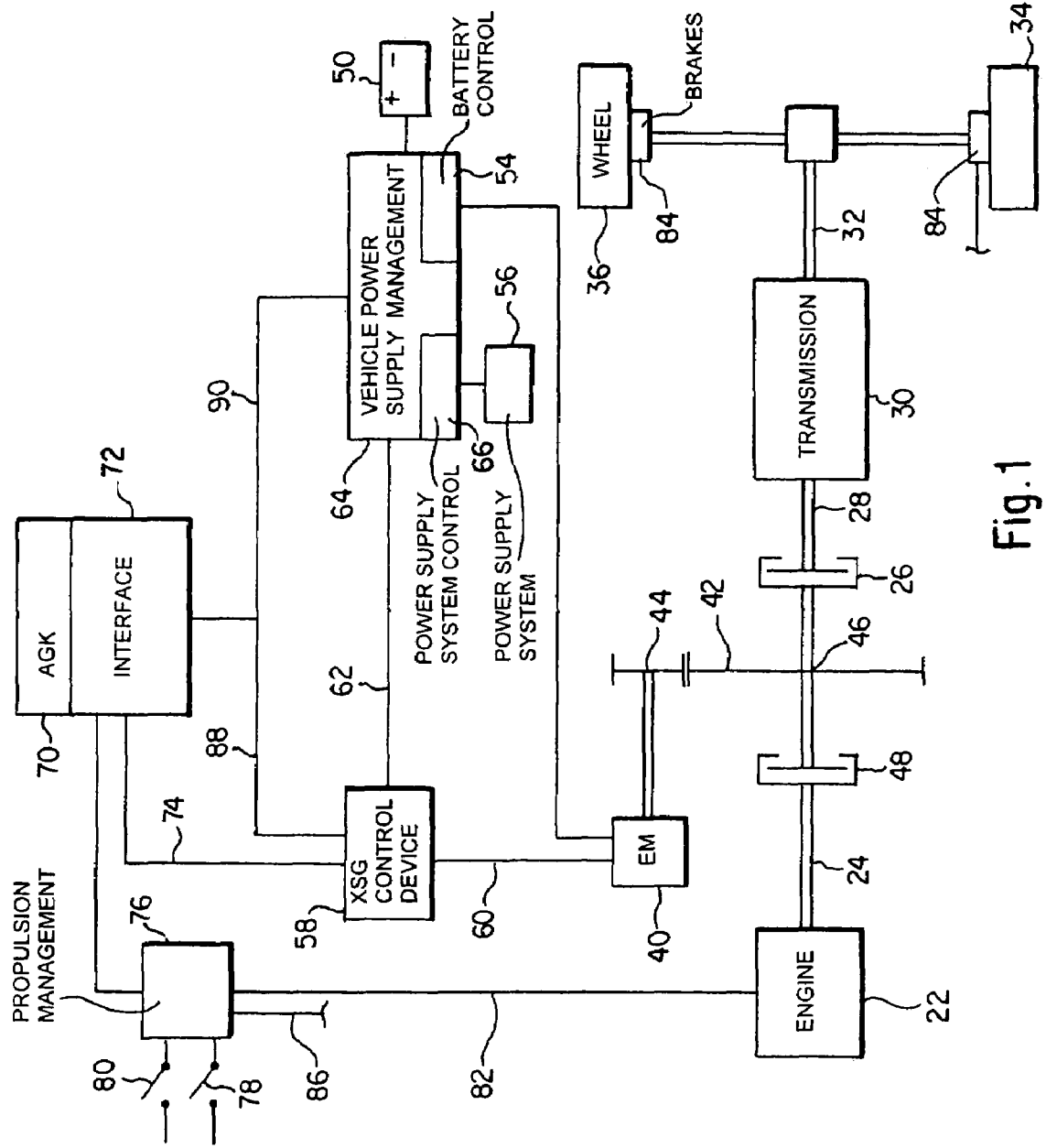
FIG. 1 is a schematic block diagram (not to scale) of a propulsion system and a vehicle power supply system for a motor vehicle, as well as a device for coordination of the propulsion system and of the vehicle power supply system.

FIG. 1 shows, schematically, parts of a motor vehicle and, in particular, a motor vehicle propulsion system as an example of a large number of possible ways in which a propulsion system such as this can be designed. The crankshaft 24 of an internal combustion engine 22 can be connected for propulsion purposes via a clutch 26, which can be engaged and disengaged, to an input shaft 28 of a transmission 30, which has a variable step-up ratio. An output shaft 32 of the transmission 30 is connected for propulsion purposes to at least one vehicle wheel 34 and/or 36. An electrical machine 40 is connected for propulsion purposes via an auxiliary drive system which, for example, has two gearwheels 42 and 44 that are engaged with one another, to the propulsion system at a point 46 which is located between the crankshaft 24 and the clutch 26 which can be engaged or disengaged.

When the clutch 26 which can be engaged or disengaged is open, the electrical machine 40 can be driven by the internal combustion engine 22 without the motor vehicle being driven. The electrical machine 40 can preferably be operated as an electric motor as well. In this case, the electrical machine 40 can start the internal combustion engine with the clutch 26 (which can be engaged or disengaged) being open. When the clutch 26 is closed, the electrical machine 40 can feed propulsion energy into the propulsion system to the vehicle wheels 34, 36, in addition to the internal combustion engine 22. If a further clutch 48, which can be engaged or disengaged, is provided between the crankshaft 24 and the auxiliary drive 42, 44 for the electrical machine 40 then, when this clutch 48 which can be engaged or disengaged is open, the vehicle wheels 34, 36 can also be driven by the electrical machine 40 on its own, without the internal combustion engine 22.

According to one preferred embodiment of the invention, the electrical machine is a so-called starter/generator which, as an electric motor, can start the internal combustion engine 22 and, as a generator, produces electrical power (voltage and current) for one (or more) battery or batteries 50. Since the electrical machine 40 is preferably a starter/generator, the designation XSG has been used in the following description for the electrical machine as a starter/generator. However, the invention is not restricted to this.

The electrical machine 40 is electrically connected via an electrical cable run 52 and a battery control device 54 to the battery 50 and to a vehicle power supply system 56. The electrical machine 40 is controlled by the use of a control device, referred to in the following text as an XSG control device 58, which is connected via an electrical cable run 60 to the electrical machine 40.

The XSG control device 58 is connected via a further cable run 62 to vehicle power supply system management 64, which includes the battery control device 54 and a vehicle power supply system control device 66 for the vehicle power supply system 56.

A propulsion unit coordinator 70, referred to for short in the following text as AGK, receives via an interface 72 all of the data for the electrical machine 40 that is relevant for propulsion purposes via its XSG control device 58 on an electrical cable run 74, and receives from propulsion management 76, likewise via the interface 72, all the data for the propulsion system which is relevant to propulsion, in particular acceleration demands by the motor vehicle driver, as is represented schematically by an accelerator pedal 78, and braking demands by the driver, as is represented schematically by a brake pedal 80. In the case of automatic vehicle control systems, as are known, by way of example, by the expression Tempomat, acceleration demands and deceleration demands such as these for the motor vehicle may also be produced by an automatic Tempomat control device or by a vehicle control system rather than by the driver, and may be implemented in the form of control by the propulsion management, for example by an appropriate increase or decrease in the fuel supply to the internal combustion engine 22, as is illustrated schematically by a control path 82 in FIG. 1, and/or by operation of vehicle brakes 84, as is illustrated schematically by a control path 86 in FIG. 1.

In the case of anti-lock braking systems and traction control systems for the motor vehicle wheels 34, 36, as well as in the case of vehicle stability systems in order to prevent vehicle sideways skidding movements, positive and negative torque requirements such as these in the vehicle propulsion system are preferably also detected by the propulsion management 76, and are supplied via the interface 72 to the unit coordinator.

The unit coordinator is an electronic control device, preferably a computerized control device.

Via the interface 72 and via electrical cable runs 88 and 90 from the XSG control device 58 and the vehicle power supply system management 64, the unit coordinator 70 in each case demands a specific operating mode, which is also referred to in the following text and in FIG. 2 as the XSG mode, as a function of the electrical requirements for the vehicle power supply system management and the torque requirements for the propulsion system, which is formed by the internal combustion engine 22 and its propulsion link to the vehicle wheels 34, 36. According to the invention, the electrical machine 40 is operated as a generator as a function of this, such that no sudden torque changes can be felt in a disadvantageous manner in the vehicle when the propulsion system demands varying torques from the electrical machine 40. The device is preferably designed such that the electrical machine 40 can also operate as an electric motor to emit propulsion energy (torque) to the propulsion system.

The invention is designed such that the physical limits of the electrical machine are fully utilized in order to support or to provide torques for the propulsion system, in which case these torques may be positive or negative, without the battery 50 being discharged or overcharged to a disadvantageous level and without any disadvantageously detectable electrical fluctuations occurring in the vehicle power supply system. The vehicle power supply system includes, for example, the vehicle internal lighting, the vehicle external lighting, the windscreen wipers, air conditioning, refrigeration or refrigerated compartment, navigation system, television and similar electrical devices or appliances which can be used in a vehicle.

The interface 72 may be a unit or may comprise two or more interface units.

Figure 2:
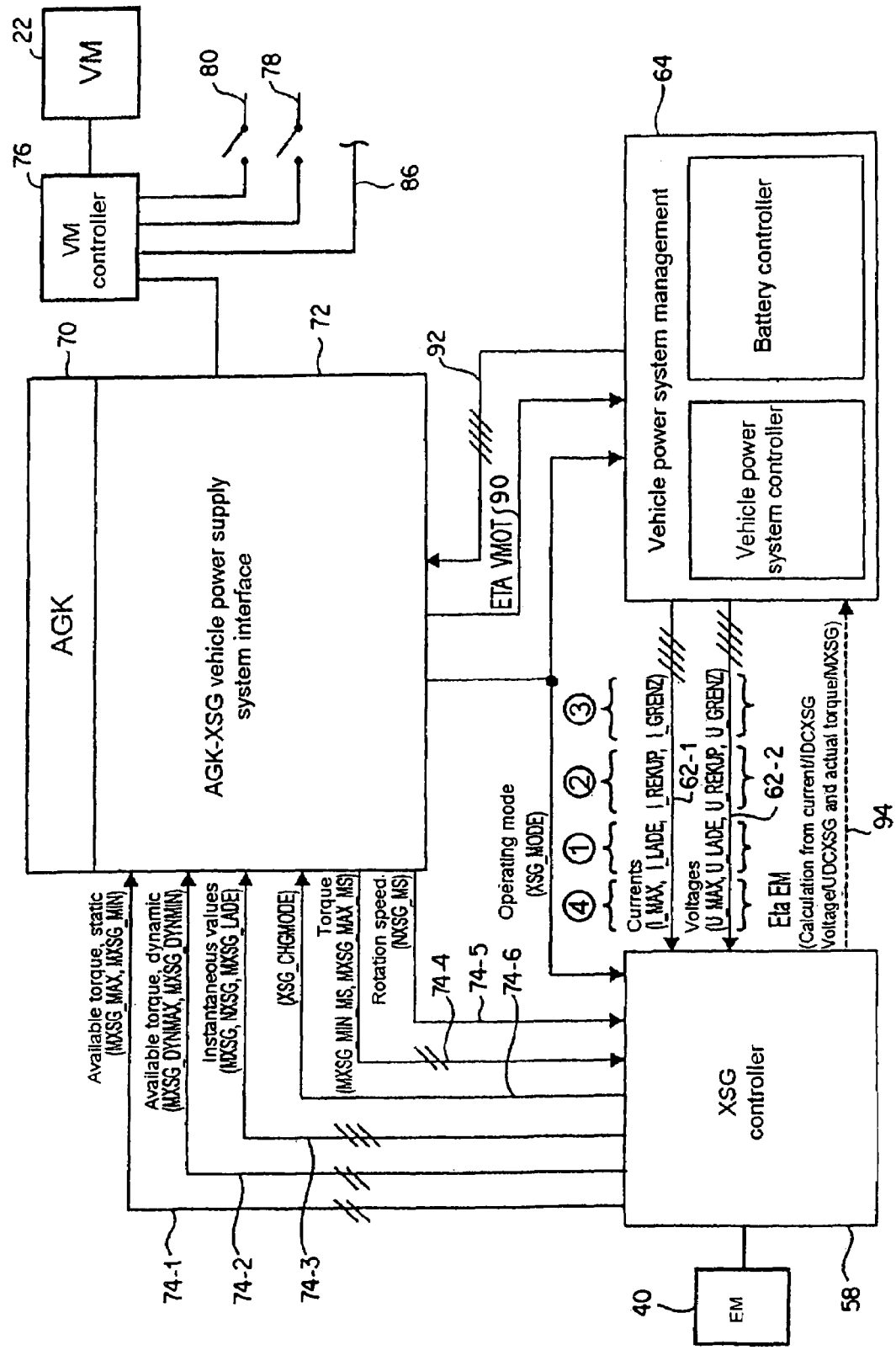
FIG. 2 shows the device according to the invention for coordination of the propulsion system and of the vehicle power supply system for a motor vehicle.

FIG. 2 shows further details of the device according to the invention for coordination of positive and negative torque requirements in the propulsion system on the one hand, and electrical requirements for the vehicle power supply system management on the other hand. The XSG control device 58 controls the electrical machine 40 as a function of the two requirements such that the electrical machine 40 can be fully utilized in terms of the positive and negative torques which can be produced by it, in order to support the propulsion system without any sudden torque changes being disadvantageously noticeable in the vehicle, and without torque changes on the electrical machine 40 leading to disadvantageously noticeable voltage fluctuations in the vehicle power supply system, for example with the vehicle lighting becoming conspicuously brighter or dimmer when torque changes take place on the electrical machine 40, and without the battery 50 being overcharged or excessively discharged.

FIG. 2 shows an overview of the invention. In order to determine the instantaneous operating state of the motor vehicle via the unit coordinator 70, which is also referred to for short as the AGK in the drawings and in the following text, this unit coordinator cyclically transmits the desired operating mode, which is also referred to in the following text as the XSG mode, at a predetermined clock frequency to the XSG control device 58 and to the vehicle power supply system management 64. The reference variables and the limit variables which are required for operation of the electrical machine 40 according to the invention are provided by the AGK 70 and the vehicle power supply system management 64.

In principle, a distinction can be drawn between three different operating modes, in which the XSG control device 58 for the electrical machine 40 can operate. These are voltage regulation, torque regulation and rotation speed regulation. The two last-mentioned operating modes of torque regulation and rotation speed regulation can be split once again, if this is desirable in practice. In this case, the XSG control device 58 switches between the different reference variables and the respectively associated limit variables. The charging voltage is predetermined by the vehicle power supply system management 64, and the rotation speed and the torque are predetermined by the propulsion management 76, in particular by an engine control device, which is contained in it, for the internal combustion engine 22.

A change to the operating mode, also referred to in the following text as the XSG mode, is in each case carried out immediately after a checking cycle or function cycle, when the AGK 70 finds during this check that a torque change has occurred in the propulsion system or there is a charge demand for electrical power in the vehicle power supply system or in the battery. In this case, propulsion management 76 uses the AGK 70, by signalling of the relevant XSG mode, to select one of six possible XSG modes, in which case a voltage mode and at least one of three torque modes and two rotation speed modes can be selected. As is shown in Table 1, below, a distinction can be drawn between six different operating modes with three types of regulation. Of these, rotation speed regulation, corresponding to the two rotation speed modes, is of less importance in practice. Rotation speed regulation will therefore not be described in detail in the following text here. According to the invention, voltage regulation is always provided for the "charging mode" operating mode, and at least one mode with torque regulation "recuperation mode" and/or "dynamic mode"

and/or "motor mode". These modes are in each case XSG modes which can be predetermined by the interface 72 via the electrical cable runs 88 and 90 to the XSG control device 58 for the electrical machine 40, as well as for the vehicle power supply system management 64 as an XSG mode (operating mode).

For the situation where communication disturbance occurs, it is possible to provide for automatic switching to the charging mode with voltage regulation and a charging voltage as the reference variable.

Furthermore, although this is not absolutely essential for the invention, an electrical cable run 90 can be provided, via which the instantaneous efficiency of the internal combustion engine 22 can be signalled from the interface 72 to the vehicle power supply system management 64. Furthermore, although this is not absolutely essential for the invention, an electrical cable run 92 can be provided, via which power limit values can be signalled from the vehicle power supply system management 64 to the interface 72, these being limit values which must not be exceeded and which, if exceeded, result in the production of appropriate warning signals.

Furthermore, an electrical cable run 94 can be provided, although this is not absolutely essential for the invention, via which the efficiency of the electrical machine 40 can be signalled from its XSG control device 58 to the vehicle power supply system management 64, for example in the form of the respective instantaneous current, the respective instantaneous voltage and the respective instantaneous torque of the electrical machine 40.

According to Table 1, which is shown below, and FIG. 2, the vehicle power supply system management 64 passes via the electrical cable run 62, which is subdivided in FIG. 1 into a current signal path 62-1 and a voltage signal path 62-2, current values "I" and voltage values "U" in the form of value pairs 1, 2, 3 and 4 as current and voltage requirements to the XSG control device 58 for the electrical machine 40. The value pairs are electrical signals which define the previously calculated currents and required voltages.

The value pair 1 defines the required charging current I-Lade and the required charging voltage U-Lade for the charging mode shown in Table 1. The value pair 2 defines the required recuperation current I-Rekup and the required recuperation voltage U-Rekup for the recuperation mode in Table 1. The value pair 3 defines the required current limit I-Grenz and the required voltage limit U-Grenz for the dynamic mode in Table 1. The value pair 4 defines the maximum current level I-Max and the minimum voltage U-Min for the dynamic operating mode in Table 1. The operating mode (XSG mode) may in each case be one of the following operating modes referred to in Table 1, the charging mode, the motor mode, the recuperation mode or the dynamic mode.

In the charging operating mode (XSG mode), the value pair 1 "I-Lade and U-Lade" is used, and the charging voltage U-Lade is the reference variable, According to Table 1, this is voltage regulation.

In the recuperation operating mode (XSG mode), the value pair "I-Rekup and U-Rekup" is used, and the torque demand from the unit coordinator 70 is the reference variable. According to Table 1, this is torque regulation.

In the dynamic operating mode (XSG mode), the value pair "I-Grenz and U-Grenz" is used, and the torque demand from the unit coordinator 70 is the reference variable, which is predetermined by the unit coordinator for the XSG control device 58 for the electrical machine 40.

The motor operating mode (XSG mode) means an electrical machine 40 mode in which this electrical machine 40 acts as an electric motor and the value pair 4 "I-Max and U-Min" is used. According to Table 1, this is torque regulation, in which the torque demand from the unit coordinator 70 is passed on as a reference variable to the XSG control device 58 for the electrical machine 40.

The two operating modes (XSG modes) "recuperation mode" and "dynamic mode" are both operating modes in which the electrical machine 40 acts as an electrical brake, and in this case passes electrical power to the battery 50 and, possibly, also directly to the vehicle power supply system 56, provided that the vehicle power supply system is designed appropriately. These two modes are both torque regulation and differ only in that the recuperation mode is intended for relatively long operation and for continuous operation of the electrical machine 40 as a generator, so that the limit values need to be set such that specific voltage values are maintained for the battery and for the vehicle power supply system even during relatively long term generator operation. The expression dynamic mode is used when the electrical machine 40 is operated only for a short time as a generator for current recuperation, so that the voltage limits can be set higher and the current calculated in advance is higher (capacitor effect of the battery/double-layer effect) than for relatively long-lasting generator operation, which is referred to here as the recuperation mode.

The XSG control device 58 for the electrical machine 40 can use the value pairs 1, 2, 3 and 4 as mentioned in FIG. 2 to calculate static torques MXSG-Max and MXSG-Min which are available from the electrical machine 40 and can be passed via an electrical cable run 74-1 via the interface 72 to the unit coordinator 70; furthermore, the dynamic torques MXSG-DYNMAX and MXSG-DYNMIN which are available for the electrical machine 40 are calculated in advance and are signalled via a cable run 74-2 to the interface 72 and, through it, to the unit coordinator 70; in addition, the instantaneous values of the torque MXSG, of the rotation speed NXSG, of the charging mode torque MXSG-LADE are calculated and are signalled via an electrical cable run 74-3 via the interface 72 to the unit coordinator 70. In this case, the charging torque MXSG-LADE is the instantaneous value only when the electrical machine 40 can follow the demands of the vehicle power supply system management 64, otherwise it is the calculated value.

The unit coordinator 70 can preset the minimum required torque MXSG-MIN-MS and the maximum required torque MXSG-MAX-MS via an electrical cable run 74-4 and via the interface 72 for the XSG control device 58 for the electrical machine 40. It is also possible for the unit coordinator 70 to preset a required rotation speed MXSG-MS for the electrical machine 40 via an electrical cable run 74-5 and via the interface 72 for the XSG control device 58.

The XSG control device 58 can signal to the unit coordinator 78 via a cable run 74-6 and via the interface 72 when it is carrying out a change from one reference variable to the other reference variable, or vice versa, as is indicated in FIG. 2 by the signal XSG-CHGMODE. The cable runs 74-1, 74-2, 74-3, 74-4, 74-5 and 74-6 are parts of the cable run 74 which is illustrated schematically, just in the form of a line, in FIG. 1.

Further details from Table 1 are described in the following text.

Table 1 shows the rotation speed regulation, torque regulation and voltage regulation control modes. The operating modes, referred to in FIG. 2 as the XSG mode, namely the charging mode, the motor mode (mode for the electrical machine 40), the recuperation mode, the dynamic mode, the rotation speed mode and the rotation speed limit mode, are also indicated. The required torque MXSG-MS from the electrical machine in each case has a value which depends on the driving states of the motor vehicle. It is in each case between zero and a maximum for rotation speed regulation.

The required torque MXSG-MS is also indicated. As can be seen from Table 1, this required torque is greater than zero in the motor mode and is less than zero in both the recuperation mode and the dynamic mode. The dynamic mode is used only when a dynamic bit "1" is set.

machine 40 to the operating mode (XSG mode) "recuperation mode". The torque reference variable MXSG-MAX-MS may vary only within a range which is defined by the voltage limit values minimum voltage U-MIN and maximum voltage U-REKUP.

Description of the Dynamic Mode:

The dynamic mode denotes a recuperation mode which is restricted to a predetermined short operating period. The unit

TABLE 1

| Control mode | Operating mode XSG mode | Required torque MXSG-MS | Required torque mMXSG-MS | Dynamic bit selection | See description | Reference variable | Limit values, priority 1 | Limit values, priority 2 |
|---|---|---|---|---|---|---|---|---|
| Voltage | Charging mode | X | X | X | | U-LADE | MXSG-MIN-MS MXSG-MAX-MS | — |
| Torque | Motor mode | X | >0 | X | | MXSG-MAX-MS | U-MIN, U-REKUP | — |
| | Recuperation mode | X | <0 | 0 | | MXSG-MAX-MS | U-MIN. U-REKUP | — |
| | Dynamic mode | X | <0 | 1 | | MXSG-MAX-MS | U-MIN, U-GRENZ | — |
| Rotation speed | Rotation speed mode | 0–max | X | 0 | | NXSG-MS | MXSG-MIN-MS, MXSG-MAX-MS | U-MIN, U-REKUP |
| | Rotation speed limit mode | 0–max | X | 1 | | NXSG-MS | MXSG-MIN-MS, MXSG-MAX-MS | U-MIN. U-GRENZ |

Description of the Charging Mode:

In the charging mode, the vehicle power supply system management 64 controls the electrical machine 40 as a generator, using the charging voltage U-LADE as a reference variable. In this case, the unit coordinator 70 keeps sudden torque changes in the instantaneous torque of the electrical machine 40 (generator) within the torque bandwidth which is defined in this way by presetting a minimum torque limit value MXSG-MIN-MS and by presetting a maximum torque limit value MXSG-MAX-MS. The limit values thus form a bracketing function, limiting torque fluctuations. The charging voltage U-LADE as a reference variable can therefore be varied only to the extent to which the electrical machine 40 moves within the torque limit values. The unit coordinator 70 sets the vehicle power supply system management 64 and the XSG control device 58 for the electrical machine 40 to the operating mode "charging mode".

Description of the Motor Mode:

Unless inhibited by the vehicle power supply system management 64, the unit coordinator 70 can pass a torque demand via the interface 72 as the reference variable MXSG-MAX-MS to the XSG control device 58 for the electrical machine 40. The unit coordinator 70 sets the vehicle power supply system management 64 and the XSG control device 58 to the operating mode "motor mode" (XSG mode). This motor mode may also be referred to as the "boost mode". The torque reference variable MXSG-MAX-MS is indicated in Table 1. The torque can vary only within the limit values which are defined by the voltage limits U-MIN as the minimum voltage and U-REKUP as the maximum voltage.

Description of the Recuperation Mode:

The torque demand from the unit coordinator 70 is passed as the reference variable MXSG-MAX-MS to the XSG control device 58 for the electrical machine 40. The unit coordinator 70 sets the vehicle power supply system management 64 and the XSG control device 58 for the electrical coordinator 70 passes the torque demand as the reference variable MXSG-MAX-MS to the XSG control device 58 for the electrical machine 40. The torque reference variable MXSG-MAX-MS may vary only within the limits which are defined by the limit values minimum voltage U-MIN and maximum voltage U-GRENZ. The unit coordinator 70 sets the vehicle power supply system management 64 and the XSG control device 58 for the electrical machine 40 to the operating mode (XSG mode) "dynamic mode", which can also be referred to as the "limit mode". The maximum voltage U-GRENZ may be higher than the maximum voltage U-REKUP, because the dynamic mode is limited to a short time period, while the recuperation mode is not.

Description of the Rotation Speed Mode:

The rotation speed demand from the unit coordinator 70 is passed on as a reference variable NXSG-MS to the XSG control device 58 for the electrical machine 40. The unit coordinator also sets the vehicle power supply system management 64 and the XSG control device 58 to the operating mode (XSG mode) "rotation speed mode". Changes to the rotation speed of the electrical machine 40 are limited by the limit values indicated in Table 1, to be precise as the first priority by the minimum required torque MXSG-MIN-MS and a maximum required torque MXSG-MAX-MS and as a second priority by a minimum voltage U-MIN and a maximum voltage U-REKUP.

Description of the Rotation Speed Limit Mode:

In comparison to the normal rotation speed mode, this is an operating mode in which the upper limit voltage U-GRENZ may be higher than the upper voltage which is defined as the recuperation voltage U-REKUP. The rotation speed demand from the unit coordinator 70 is passed as a reference variable to the XSG control device 58 for the electrical machine 40. The vehicle power supply system management 64 and the XSG control device 58 for the electrical machine 40 are set to the operating mode (XSG mode) "rotation speed limit mode". Changes to the rotation speed of the electrical machine 40 are limited by limit values indicated in Table 1, to be precise as the first priority by the minimum required torque MXSG-MIN-MS and a maximum required torque MXSG-MAX-MS, and as a second priority by a minimum voltage U-MIN and a maximum voltage U-GRENZ.

Available Torques:

The vehicle power supply system management 64 continuously signals to the XSG control device 58 for the electrical machine 40 the value pairs 1, 2, 3 and 4 of the electrical voltages and electrical currents. The XSG control device 58 uses them to determine continuously, and independently of the instantaneous operating mode (XSG mode), corresponding static and dynamic torque values which must not be exceeded by the unit coordinator 70 in the operating modes with torque management (boost, recuperation, recuperation in the dynamic mode or limit mode), and which restrict the limit value in the charging mode in which the charging voltage is the reference variable. The calculated torque values in this case take account of the instantaneous operating point and the efficiency of the electrical machine 40, and guarantee compliance with the voltage limit values and current limit values as preset by the vehicle power supply system management 64. This results, so to speak, in an electrical and mechanical power balance.

Table 2 shows what available torques the XSG control device 58 for the electrical machine 40 can calculate from the data from the vehicle power supply system management 64. The table also indicates the operating mode for which the calculation is carried out.

TABLE 2

| VEHICLE POWER SUPPLY SYSTEM MANAGEMENT | | Available torque calculated by the XSG controller | For the operating mode | Operating mode duration (example) |
|---|---|---|---|---|
| U | I | | | |
| U-MIN | I-MAX | MXSG-MAX | Boost | min 10 s |
| U-MIN | I-MAX | MXSG-DYNMAX | Brief boost | <1 s |
| U-REKUP | I-REKUP | MXSG-MIN | Recuperation | min 10 s |
| U-GRENZ | I-GRENZ | MXSG-DYNMIN | Limit (dyn. recup) | <1 s |

The unit coordinator 70 can use the calculated torques for the selected operating mode (XSG mode) to form a preset torque (required torque MXSG-MAX-MS), which varies between a minimum torque MXSG-DYNMIN and a maximum torque MXSG-DYNMAX, which is the widest range of the available torque.

In order to achieve continuous transitions without any sudden changes or jumps when a change takes place from the standard operating mode (charging mode), in which the charging voltage U-LADE is the reference variable, to a torque operating mode in which a torque is the reference variable, and back again, the vehicle power supply system management 64 continuously transmits the charging voltage variable U-LADE and the charging current variable I-LADE to the XSG control device 58 for the electrical machine 40. The XSG control device 58 can use this to form the charging torque MXGS-LADE for the battery charging mode. In the charging mode, the value pair U-LADE and I-LADE (charging voltage and charging current) is the reference variable and is at the same time the measured value, while, in all of the other modes, these are calculated values such as the calculation value pair comprising the recuperation voltage U-REKUP and recuperation current I-REKUP. The values of MXSG required value and MXSG-LADE are thus identical in the charging mode.

In order to avoid sudden torque changes, an operating mode change is always carried out with a ramp effect. When changing from voltage management in the charging mode to torque management in one of the other modes, the ramp effect results directly from the preset torque. This does not occur in the opposite situation since, when changing from torque management to voltage management, an immediate change is made to voltage management. A torque ramp is produced here by means of the limit variables comprising the minimum required torque MXSG-MIN-MS and the maximum required torque variable MXSG-MAX-MS. In order to signal that the new required voltage has been reached at the end of the ramp, a mode change bit may be sent and this is referred to, for example, as XSG-CHGMOD. By way of example, the bit value "1" may indicate that a mode change must take place because the reference variable is outside the tolerance band. The value "0" then indicates that the instantaneous value (actual value) of the voltage, rotation speed or torque that is the reference variable at that time is within the specified tolerance band.

The following Table 3 shows the values which are sent from the unit controller 70 to the XSG control device 58 for motor control of the electrical machine 40.

TABLE 3

Input variables for electrical machine control, obtained from the unit coordinator

| Name | Meaning |
|---|---|
| XSG-MODE | Operating mode of the electrical machine |
| MXSG-MAX-MS | Limit value for the maximum torque of the electrical machine |
| MXSG-MIN-MS | Limit value for the minimum torque of the electrical machine |
| NXSG-MS | Required rotation speed of the electrical machine |
| ASS-STOPP | ASS motor stop, 1 = stop, 0 = normal operation |

Table 4 shows the variables which are sent from the vehicle power supply system management 64 to the XSG control device 58 for the electrical machine 40.

TABLE 4

Requirements of the vehicle power supply system management for the electrical machine control

| Name | Meaning |
|---|---|
| I-MAX | Maximum current in the electrical machine in the motor mode |
| U-MIN | Minimum tolerable voltage for the electrical machine in the motor mode |
| I-LADE | Current which occurs for U-LADE management |
| U-LADE | Reference variable in the charging mode |
| I-REKUP | Generator current which occurs when U-REKUP is used for limiting |
| U-REKUP | Maximum tolerable recuperation voltage |
| I-GRENZ | Generator current which occurs when I-GRENZ is used for limiting |
| U-GRENZ | Maximum tolerance limit recuperation voltage for dynamic operation |

Table 5 shows the output variables from the XSG control device 58 for the electrical machine 40, which are supplied to the interface 72.

TABLE 5

Output variables from the electrical machine control device, which it supplies to the interface

| Name | Meaning |
|---|---|
| NXSG | Instantaneous rotation speed of the electrical machine |
| MXSG | Instantaneous torque of the electrical machine |
| MXSG-LADE | Torque of the electrical machine which occurs in the charging mode |
| MXSG-DYNMAX | Maximum positive torque of the electrical machine (e.g. <0.5 s) |
| MXSG-DYNMIN | Minimum torque of the electrical machine, negative torque (e.g. <0.5 s) for U-GRENZ |
| MXSG-MAX | Maximum positive torque of the electrical machine (e.g. min 10 s) |
| MXSG-MIN | Minimum torque of the electrical machine, negative torque (e.g. min 10 s) for U-REKUP |
| XSG-CHGMODE | Bit 1 = indication for mode change, bit 0 = on reaching the reference variable |
| IDCXSG | Direct current |
| UDCXSG | DC voltage |

The vehicle power supply system is acceptable when rotation speed changes and torque changes in the electrical machine 40 are not unpleasantly noticeable, for example as a result of fluctuations in the light brightness of the vehicle internal lighting or vehicle external lighting, or as a result of fluctuations in radio reception or sudden torque changes, which are perceptible in the motor vehicle, from the electrical machine or from the propulsion system. Furthermore, it is also desirable in particular to be able to make optimum use of negative torques on the electrical machine for recuperation (vehicle braking). According to one preferred embodiment, the electrical machine 40 may, however, also be used as an electric motor for starting the internal combustion engine. According to a further preferred embodiment, the electrical machine 40 may also be used as an electric motor for feeding torque to the propulsion system. According to a further preferred embodiment of the invention, the electrical machine 40 is in the form of a generator whose torque can be varied to such an extent that the torque which is required from the electrical machine 40 in the generator mode can be reduced in order to have correspondingly more propulsion torque from the internal combustion engine in the propulsion system when this is temporarily expedient, for example for a boost mode for the motor vehicle, for example for starting the vehicle from rest, for overtaking other vehicles, or for climbing up short inclines in the roadways. The invention preserves the good operation of the electrical power supply system while at the same time making all of the torque from the electrical machine 40 available for the propulsion system.

The solution according to the invention is to form a voltage reference variable for the battery charging mode and a torque reference variable for the propulsion system, and at the same time to form limit variables from the respective other variable, so that the voltage reference variable is limited by torque limit variables and the torque reference variable is limited by voltage limit variables. In consequence, the available torques from the electrical machine 40 are utilized completely.

The invention ensures that no important requirement is suppressed, that is to say neither requirements from the vehicle power supply system and the battery nor requirements from the propulsion system.

The limit variables are required because the power data for electrical machines and batteries is normally subject to very major discrepancies (inaccuracies) from the values which can actually be achieved. Automatic initial calculation of the various variables in order to determine the reference variable allows better utilization of the electrical machine and of the battery.

The limit variables form a tolerance band and are chosen to be sufficiently narrow that, when the limits are reached, a sudden torque change in the propulsion system is not exceeded when the reference variable is the voltage and the limit variables are defined by torque values. At the same time, this ensures that legal requirements and maximum permissible limit values for electrical units and devices are not exceeded when the reference variable is a torque and the limit values are defined by voltage values. In consequence, these limit values are, according to the invention, normally defined to be lower than the maximum values which can be produced for the torque and voltage.

If the reference variable is a torque, then the limit values are voltage values, between which the torque management (available torques) is variable. The voltage limit values are calculated by the power electronics in the XSG control device 58 for the electrical machine 40 as a function of the electrical values for the current and voltage, and as a function of the efficiency of the electrical machine, over its rotation speed and, possibly, as a function of other variables.

If the reference variable is a voltage, then the limit values are torque values. The instantaneous torque MXSG of the electrical machine 40 is continuously included in the calculation of the drag torque of the internal combustion engine 22. In the charging mode, the value which can be measured is equal to the value which can be calculated. Normally, torque fluctuations in the electrical machine can be compensated for directly by the internal combustion engine. One precondition, however, is a constant torque preset (preset torque) in the propulsion system. The previously mentioned torque limit variables become active only in the event of rapid voltage gradients and rapid torque gradients associated with them, such as those which can occur when switching high-power loads on and off (motor vehicle air conditioning, headlights and fog lights etc,). This results from the fact that the electrical machine has a shorter time constant than the internal combustion engine, The generator can be matched to the power requirements more quickly than the internal combustion engine.

The Following Equation is Applicable:

Torque which can be emitted from the internal combustion engine on its crankshaft=combustion torque which is produced in the internal combustion engine–the drag torque of the internal combustion engine+the (positive or negative) torque of the electrical machine.

The torque which can be emitted from the internal combustion engine on its crankshaft can also be referred to as the preset torque.

This means that changes in the positive or negative torque of the electrical machine must be compensated for by the combustion torque from the internal combustion engine in order to keep the preset torque constant.

The limit variables, either the upper limit variable or the lower limit variable, come into effect only when the internal combustion engine can no longer cope with a rapid voltage change in terms of the resultant changes in the torques in the propulsion system.

The limit variables are determined in advance as a function of the type of vehicle and its type of propulsion system. The propulsion system may, for example, be a manually selectable transmission, an automatically selectable transmission, or an automatic transmission with a torque converter. While the motor vehicle is being driven, the limit variables are varied automatically as a function of the respective step-up or step-down ratio of the transmission which is arranged in the propulsion system.

The expression "charging" which is used in this description means that the voltage requirements for the vehicle power supply system 56 and for the battery 50 are provided by generator operation of the electrical machine 40. In this case, the battery is charged only to the extent that the battery 50 draws electrical power from the vehicle power supply system 56.

The expression "recuperation" in the present description means that a negative torque is demanded from the propulsion system, in particular from the vehicle wheels 34, 36 of the moving vehicle, in order to brake the moving motor vehicle. This negative torque may be equal to or less than the torque for the "charging" operating mode, "Less than" in this case means a torque which is greater in the negative direction.

The stated dynamic mode is likewise a recuperation mode which, on the basis of the definition in the present description, however, is limited to a predetermined short time period, while the expression recuperation is used in this patent application for recuperation operation, which is of unlimited time or is considerably longer than the dynamic mode.

The expression "boost" means the requirement for a positive torque from the propulsion system 22-46, in particular from the propulsion management 76, to the electrical machine 40. This torque is equal to or greater than the charging torque of the electrical machine 40 for said charging operation.

It is evident from this that there are two possible ways to define a so-called zero point from which the charging mode no longer exists, but the boost mode or the recuperation mode do exist. One possible way is to define that a boost mode exists only when the electrical machine 40 is being operated as an electric motor, otherwise it is operated as a generator. However, this requires a special electronic control device for controlling the electrical machine 40. This is not the case in this situation and it is therefore considerably more advantageous for the charging mode to be regarded as the zero point, and for this charging mode to be defined as an operating situation in which all the units in the motor vehicle, in particular the vehicle power supply system 56 and the battery 50, are connected to the electrical machine 40, and this electrical machine 40 is operated as a generator which produces the current that is required for all the connected loads, with the electrical machine 40 being driven by the internal combustion engine 22 in the propulsion system. This may be referred to as the "normal charging mode". On the basis of a zero point definition such as this, it is possible to produce a definition that a torque demand from the propulsion system or from the propulsion management 76 which differs in the positive direction from the normal charging mode is a boost, and that a torque demand which differs in the negative direction from the normal charging mode is recuperation. Since the electrical machine 40 operates as a generator in the charging mode, this can mean that a small positive torque requirement for the propulsion system is satisfied by reducing the generator power, and the boost mode is thus produced by a smaller generator power level from the electrical machine 40, without the electrical machine 40 being operated as a motor.

The invention can be implemented by providing the charging mode and at least one of the torque modes comprising the motor mode, recuperation mode and/or dynamic (recuperation) mode.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for open-loop or closed-loop control of an electrical system and a propulsion system of a motor vehicle, with the propulsion system having an internal combustion engine and a transmission with a variable step-up and/or step-down ratio, the electrical system having a vehicle power supply system and at least one battery connected to the vehicle power supply system, and at least one electrical machine being provided, wherein said electrical machine is operable during a normal charging mode as a generator for supplying current to the battery and to the vehicle power supply system from the propulsion system, and is drivable by the propulsion system as a generator in a recuperation mode to produce a braking torque and to supply the at least one battery and the vehicle power supply system with current and is operable as an electric motor for emitting torque to the propulsion system, wherein the device controls the at least one electrical machine in different operating states by different signals, in which case a charging voltage for the normal charging mode is produced automatically as a voltage reference variable for controlling the electrical machine from signals from a vehicle management as a function of the respective requirements for electrical power from the vehicle power supply system and from the battery at any given time;

further wherein the device automatically provides the respective torque demand at any given time as a torque reference variable for controlling the electrical machine as a function of the respective requirements, at that time, for a positive or negative torque for the propulsion system, in which case changes in the voltage reference variable downwards and upwards are limited by predetermined torque limit values for the electrical machine which define a torque tolerance band, in which further case, changes in the torque reference variable upwards and downwards are limited by predetermined voltage limit values for the electrical machine, which form a voltage tolerance band, means for automatic cyclic checking of the reference variables, wherein the electric machine is controlled automatically by the voltage reference variable, but a change takes place to the torque reference variable for controlling the electrical machine, provided that the tolerance bands are complied with, when and for as long as the torque reference variable demands from the electrical machine a positive or negative torque which is not the same as the predetermined torque on the electrical machine in order to produce the charging voltage.

2. The device according the claim 1, further comprising a unit coordinator configured to use the respective torque requirements on the propulsion system to form the torque reference variable.

3. The device according to claim 1, wherein the device forms the torque reference variable as a function of torque requirements that are defined automatically for torque stabilization of individual vehicle wheels.

4. The device according to claim 2, wherein the device forms the torque reference variable as a function of torque requirements that are defined automatically for torque stabilization of individual vehicle wheels.

5. A method for open-loop or closed-loop control of an electrical system and a propulsion system of a motor vehicle, with the propulsion system having an internal combustion engine and a transmission with a variable step-up and/or step-down ratio, the electrical system having a vehicle power supply system and at least one battery connected to the vehicle power system, and at least one electrical machine being provided which is operable during a normal charging mode as a generator for supplying current to the battery and to the vehicle power supply system from the propulsion system, and is also drivable by the propulsion system as a generator in a recuperation mode to produce a braking torque and to supply the at least one battery and the vehicle power supply system with current and the electrical machine is also operable as an electric motor for emitting torque to the propulsion system, the method comprising the acts of:

controlling the at least one electrical machine in different operating states by different signals, in which case a charging voltage for the normal charging mode is produced automatically as a voltage reference variable for controlling the electrical machine from signals from a vehicle management as a function of the respective electrical power requirements from the vehicle power supply system and from the battery at any given time, automatically providing the respective torque demand at any given time as a torque reference variable for controlling the electrical machine as a function of respective torque requirements, at that time, for a positive or negative torque for the propulsion system, in which case changes in the voltage reference variable downwards and upwards are limited by predetermined torque limit values for the electrical machine which define a torque tolerance band, in which further case, changes in the torque reference variable upwards and downwards are limited by predetermined voltage limit values for the electrical machine, which form a voltage tolerance band, automatically cyclically checking the reference variables, controlling the electrical machine automatically by the voltage reference variable, wherein a change takes place to the torque reference variable for controlling the electrical machine, provided that the torque tolerance band and the voltage tolerance band are complied with, when and for as long as the torque reference variable demands from the electrical machine a positive or negative torque which is not the same as the predetermined torque on the electrical machine in order to produce the charging voltage.

6. The method according to claim 5, wherein a unit coordinator uses the respective requirements on the torque propulsion system to form the torque reference variable.

7. The method according to claim 5, wherein the torque reference variable is also formed as a function of torque requirements which are defined automatically for torque stabilization of individual vehicle wheels.

8. The method according to claim 6, wherein the torque reference variable is also formed as a function of torque requirements which are defined automatically for torque stabilization of individual vehicle wheels.

9. A method for operating at least one electrical machine for a motor vehicle equipped with a propulsion system, a vehicle power supply system, and at least one battery, the method comprising the acts of:

coordinating torque requirements for the propulsion system and voltage requirements for the vehicle power supply system and the at least one battery for the vehicle power supply system, by forming a voltage reference variable for the voltage requirements of the vehicle power supply system and a torque reference variable for the torque requirements of the propulsion system;

limiting the voltage reference variable by upper and lower torque limit values which must not be overshot or undershot in an event of changes to the voltage reference variable; and limiting the torque reference variable by voltage limit values which must not be overshot or undershot in an event of torque changes; and utilizing the voltage reference variable and torque reference variable to control the electrical machine in different operating states.

10. An improved device for a control of an electrical system and a propulsion system of a motor vehicle with the propulsion system having an internal combustion engine and a variable transmission, the electrical system having a battery connected to a vehicle power supply system, and an electrical machine operable in a normal charging mode as a generator for supplying current to the battery and to the vehicle power supply system, with said electrical machine being also operable as an electric motor to emit torque to the propulsion system as a function of a torque demand, the improvement comprising a voltage signal generator for producing a voltage reference variable as a charging voltage for controlling the electrical machine in a normal charging mode, and a torque demand generator for producing a torque reference variable for controlling the electrical machine in a propulsion mode, wherein the voltage reference variable and the torque reference variable are dependent on each other in that a permissible variation of the voltage reference variable is limited by torque values, and a permissible variation of the torque reference variable is limited by voltage values.

11. The improved device as in claim 10, wherein the torque values are minimum and maximum torque demands that form a torque tolerance band, and the voltage values are minimum and maximum voltage signals that form a voltage tolerance band.

12. The improved device as in claim 10, wherein the improvement further comprises the torque reference variable being changeable so long as a value of the torque reference variable is not the same as a predetermined torque value required to produce the charging voltage.

13. The improved device as in claim 10, wherein the torque demand comprises a breaking torque demand.

14. The improved device as in claim 10, further comprising an automatic cyclic checking module for automatically and cyclically checking respective values of the torque reference variable and the voltage reference variable.

* * * * *